(12) United States Patent
Ihara et al.

(10) Patent No.: US 7,745,519 B2
(45) Date of Patent: Jun. 29, 2010

(54) NON-HALOGEN FLAME-RETARDANT RESIN COMPOSITION

(75) Inventors: Toshiaki Ihara, Gunma-ken (JP); Takashi Aketa, Gunma-ken (JP)

(73) Assignee: Shin Etsu Chemical Co., Ltd., Tokyo (JP)

( * ) Notice: Subject to any disclaimer, the term of this patent is extended or adjusted under 35 U.S.C. 154(b) by 749 days.

(21) Appl. No.: 11/637,720

(22) Filed: Dec. 13, 2006

(65) Prior Publication Data

US 2007/0135538 A1 Jun. 14, 2007

(30) Foreign Application Priority Data

Dec. 14, 2005 (JP) .............................. 2005-360242

(51) Int. Cl.
 *C08K 5/3447* (2006.01)
 *C08K 5/3475* (2006.01)
(52) U.S. Cl. ........................... 524/91; 524/93; 524/434; 524/435; 524/436; 524/437
(58) Field of Classification Search ................... 524/91, 524/93, 434, 435, 436, 437
See application file for complete search history.

(56) References Cited

U.S. PATENT DOCUMENTS

| | | | | |
|---|---|---|---|---|
| 3,950,301 A | * | 4/1976 | Balog et al. | 524/91 |
| 4,127,586 A | * | 11/1978 | Rody et al. | 548/260 |
| 7,115,678 B2 | * | 10/2006 | Ihara et al. | 524/403 |
| 2002/0198303 A1 | * | 12/2002 | Ihara et al. | 524/436 |

FOREIGN PATENT DOCUMENTS

| EP | 1 441 004 A2 | 7/2004 |
|---|---|---|
| JP | 2003128939 A | 5/2003 |

OTHER PUBLICATIONS

English-language Abstract of JP 2003128939, Publication Date May 8, 2003.

* cited by examiner

*Primary Examiner*—Kriellion A Sanders
(74) *Attorney, Agent, or Firm*—Millen, White, Zelano & Branigan, P.C.

(57) ABSTRACT

Provided by the invention is a non-halogen flame-retardant thermoplastic resin composition not requiring crosslinking with a peroxide, having excellent in moldability, and moreover, having high flame-retardancy to pass the test for V-0 grade of the UL-94. standards The non-halogen flame-retardant thermoplastic resin composition comprises, as a uniform blend: (A) 100 parts by mass of a thermoplastic resin other than polycarbonate and polyphenylene ether resins, (B) 10 to 300 parts by mass of an inorganic powder, (C) 1 to 50 parts by mass of an organopolysiloxane having a specified structure, and (D) 0.01 to 10 parts by mass of an organic compound having a specified structure.

9 Claims, No Drawings

NON-HALOGEN FLAME-RETARDANT RESIN COMPOSITION

BACKGROUND OF THE INVENTION

1. Field of the Invention

The present invention relates to a non-halogen flame-retardant resin composition, which does not generate halogen gas during combustion, demonstrates high flame-retardancy, and excels in safety for the environment.

2. Description of the Related Art

As thermoplastic resins are flammable, various technologies to confer flame-retardancy have been proposed for applications that require flame-retardancy. As is known, flame-retardant formulations mixing a halogen-based flame-retardant agent such as a bromine compound and antimony oxide, which excel in flame-retardancy, with a thermoplastic resin, have been used as such technique. Halogen-based flame-retardant agents exert excellent flame-retardant effect by radical trapping activity, halogen gas (incombustible gas) generation, and the like. However, as this halogen gas is harmful to organisms, as is a recent issue, emergence of flame-retardant resin compositions with non-halogen formulations is strongly desired.

Various technologies using metal hydroxides, such as, magnesium hydroxide, have been proposed in recent years as flame-retardant formulations of thermoplastic resins used in the manufacture of coating insulators for electric wires/cables and sheets. Metal hydroxides have an advantage of low toxicity, small amount of smoke generation, and low corrosiveness, and exert flame-retardant action by releasing crystalization water at combustion time.

However, as this flame-retardant effect is not strong, for instance, when the base resin, which is the target of the addition, is polyolefin, even if, with respect to 100 parts by mass of polyolefin, an equal amount of 100 parts by mass is mixed, the oxygen index, which is one of the indicators of material combustibility (flammability), demonstrates a number of only 30 or less.

Flame-retardant resin compositions mixing, for instance, a metal hydroxide that has been surface treated with a surface treatment agent, such as, a silane coupling agent, with a thermoplastic resin, are known as flame-retardancy technologies for thermoplastic resins using metal hydroxides (see Japanese Patent Publication No. 2825500, Japanese Patent Publication No. 3019225 and Japanese Patent Publication No. 3072746).

However, merely mixing a surface treated metal hydroxide with a thermoplastic resin leaves a low and insufficient oxygen index, such that, in order to confer the thermoplastic resin with sufficient flame-retardancy, it is necessary to mix a metal hydroxide in large amounts.

In addition, flame-retardant resin compositions by admixing of a metal hydroxide and an organopolysiloxane with a thermoplastic resin have been reported (see Japanese Patent Examined Publication No. H7-119324, Japanese Patent Publication No. 3051211, Japanese Patent Publication No. 3063759 and Japanese Patent Application Laid-open No. H4-226551) as flame-retardancy technologies other than those described above. Although flame-retardancy increases when a metal hydroxide and an organopolysiloxane are used in combination, in order to allow compliance with various flame-retardancy regulations, a flame-retardant formulation exerting still higher flame-retardancy is necessary.

In addition, recently, non-halogen flame-retardant resin compositions mixing a metal hydroxide, an organopolysiloxane and an additive with a thermoplastic resin have been reported (see Japanese Patent Application Laid-open No. 2004-250676 and Japanese Patent Application Laid-open No. 2003-128939). Although it is clear that these flame-retardant resin compositions have increased flame-retardancy with an oxygen index showing values of 48 or higher, the flame-retardancy is still insufficient to pass UL-94 and UL-VW1 test standards.

In addition, a non-halogen flame-retardant resin composition mixing a metal hydroxide, a highly polymerized organopolysiloxane, an organopolysiloxane containing an unsaturated functional group, and a radical generating agent, with a thermoplastic resin, has been reported (Japanese Patent Application Laid-open No. 2003-034755).

Although this non-halogen flame-retardant resin composition is imparted with enough flame-retardancy to pass VW-1, as it must be crosslinked with a peroxide, not only manufacturing becomes laborious due to its low flowability, it has problems in terms of moldability.

SUMMARY OF THE INVENTION

Therefore, it is an object of the present invention to provide a non-halogen flame-retardant resin composition capable of solving the aforementioned prior art problems, that is to say, a non-halogen flame-retardant resin composition not requiring crosslinking with a peroxide, having excellent moldability, and moreover, having high flame-retardancy to pass the V-0 class of UL-94.

As a result of the extensive studies to solve the aforementioned problems, the inventors have discovered that a resin composition comprising the components (A) to (D) described below without mixing an organic peroxide has high flame-retardant effect beyond imagination, and, also excels in moldability, and reached completion of the present invention.

That is to say, the present invention provides a non-halogen flame-retardant resin composition comprising:

(A) 100 parts by mass of a thermoplastic resin (excepting for polycarbonates and polyphenylene ethers);

(B) 10 to 300 parts by mass of an inorganic powder;

(C) 1 to 50 parts by mass of an organopolysiloxane represented by the following average unit formula (1), $$R_a SiO_{(4-a)/2} \quad (1)$$

(in Formula (1), R represents a hydroxyl group, an alkyl group having 1 to 10 carbon atoms, an alkenyl group or an aryl group having 2 to 10 carbon atoms, and a represents a number from 1.9 to 2.1 ); and (D) 0.01 to 10 parts by mass of a compound represented by the following chemical formula (2), (3) or (4):

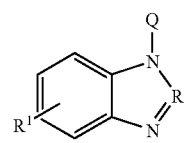

(2)

(in formula (2), R represents a carbon atom or a nitrogen atom, $R^1$ represents an alkyl group having 1 to 20 carbon atoms or an alkylphenyl group having 7 to 20 carbon atoms, and Q represents a hydrogen atom or a sodium atom); and

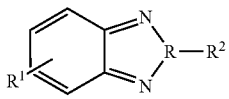
(3)

(in formula (3), R represents a carbon atom or a nitrogen atom, $R^1$ represents an alkyl group having 1 to 20 carbon atoms or an alkylphenyl group having 7 to 20 carbon atoms, $R^2$ represents a hydrogen atom, a hydroxyl group, an alkyl group having 1 to 20 carbon atoms, an alkylphenyl group having 7 to 20 carbon atoms, or a group represented by the formula (5) given below),

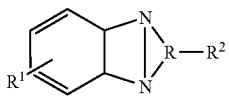
(4)

(in formula (4), R represents a carbon atom or a nitrogen atom, $R^1$ represents an alkyl group having 1 to 20 carbon atoms or an alkylphenyl group having 7 to 20 carbon atoms, $R^2$ represents a hydrogen atom, a hydroxyl group, an alkyl group having 1 to 20 carbon atoms, an alkylphenyl group having 7 to 20 carbon atoms, or a group represented by the following formula (5))

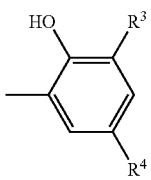
(5)

(in formula (5), $R^3$ and $R^4$ each represent a hydrogen atom, an alkyl group having 1 to 20 carbon atoms, an alkenyl group having 2 to 20 carbon atoms, a monovalent hydrocarbon group having 7 to 20 carbon atoms optionally containing an oxygen atom, or an alkylphenyl group having 7 to 20 carbon atoms).

In addition to exhibiting high flame-retardancy to pass V-0 of UL-94, the non-halogen flame-retardant resin composition of the present invention also excels in moldability and safety with respect to the environment, and in particular, excels as materials for use in forming of flame-retardant electric wires, flame-retardant tubes, flame-retardant sheets, and the like.

DESCRIPTION OF THE PREFERRED EMBODIMENTS

As described above, the non-halogen flame-retardant resin composition of the present invention comprises the components (A) to (D) as the essential ingredients. In the following the present invention will be described in detail.

The thermoplastic resin of the component (A) is not limited in particular, except for the exclusion of polycarbonates and polyphenylene ethers, and, for instance, low-density polyethylenes, high-density polyethylenes, linear low-density polyethylenes, very low density polyethylene, ultra high-molecular weight polyethylenes, polypropylenes, polypropylene-based elastomers, polyvinyl acetates, saponification products of ethylene-vinyl acetate copolymers, such as, ethylene-vinyl acetate copolymers and ethylene-vinyl alcohol copolymers, various thermoplastic elastomers, such as, ethylene-acrylate copolymers, ethylene-methyl acrylate copolymers, ethylene-ethyl acrylate copolymers, ethylene-acrylamide copolymers, ethylene-methacrylate copolymers, ethylene-methyl methacrylate copolymers, ethylene-glycidyl methacrylate copolymers, ethylene-maleic anhydride copolymers and ionomers, polystyrenes, styrene-based thermoplastic elastomers, ABS resins, polyacetals, polyethylene terephthalates, polybutylene terephthalates, and the like, can be cited. The thermoplastic resin as the component (A) may be used alone or may be used by combining two or more kinds.

Among the thermoplastic resins given above, in particular, polyolefin-based resins, polyvinyl acetate-based resins and styrene-based thermoplastic elastomers, such as, low-density polyethylenes, high-density polyethylenes, linear low-density polyethylenes, very low-density polyethylenes, ultra high molecular weight polyethylene, polypropylene, ethylene-ethyl acrylate copolymers, ethylene-vinyl acetate copolymers, polyvinyl acetates, are particularly preferred, as the synergistic effects thereof in regard to increasing the flame-retardancy of the present invention are high with the inorganic powder of the component (B), in particular metal hydroxide, and organopolysiloxane of the component (C).

The inorganic powder as the component (B) in the present invention is not limited in particular, and, for instance, aluminum hydroxide, magnesium hydroxide, antimony trioxide, antimony pentoxide, sodium antimonate, antimony tetroxide, zinc borate, zirconium compounds, molybdenum compounds, calcium carbonate, silica, silicone resin powders, silicone rubber powders, talc, acryl silicone powders, titanium oxide, pyrophyllite, quartz, diatomaceous earth, pyrite, sulfidized calcine, graphite, bentonite, kaolinite, activated charcoal, carbon black, zinc oxide, iron oxide, marble, bakelite, Portland cement, $SiO_2$ powder, boron nitride, synthetic mica, glass beads, mica, sericite, and the like, may be cited. Metal hydroxides are particularly excellent, of which magnesium hydroxide, aluminum hydroxide and calcium hydroxide are preferred.

In addition, the inorganic powders as the component (B) may be untreated or treated with a surface treatment agent, such as, saturated fatty acids, unsaturated fatty acids, titanate coupling agents, silane coupling agents, silicone oligomers, reactive silicone oils or thermoplastic resins.

The mixing amount of the component (B) in the present invention is 10 to 300 parts by mass per 100 parts by mass of the component (A), and preferably, 50 to 150 parts by mass. If 300 parts by mass is exceeded, the flowability of the composition is unduly decreased, and the composition1 is sometimes not suitable for use, and if smaller than 10 parts by mass, no sufficient flame-retardancy can be obtained.

The organopolysiloxane of Component (C) in the present invention, is a polymer represented by the average unit formula (1):

$$R_aSiO_{(4-a)/2} \qquad (1)$$

In the above formula (1), R represents a hydroxyl group, an alkyl group having 1 to 10 or, preferably, 1 to 8 carbon atoms, an alkenyl group or an aryl group having 2 to 10 carbon atoms, and for instance, methyl group, ethyl group, propyl group, butyl group and the like, can be named as the alkyl group, vinyl group, allyl group, butenyl group and the like, may be named as the alkenyl group, and phenyl group, tolyl group and the like, can be named as the aryl group.

Although the molecular structure of the organopolysiloxane of Component (C) has a main backbone that is preferably a straight chain comprising the above-mentioned siloxane unit, there is no problem if it partially contains molecular structures with branched chains. Therefore, a represents a number in the range of 1.9 to 2.1, and preferably a number in the range of 1.95 to 2.05.

The organopolysiloxane of the component (C) has a number-average degree of polymerization, which is the number-average of the total siloxane units repetition number, preferably in the range of 2,500 to 30,000, and more preferably in the range of 3,000 to 150,00. If the value of the number-average degree of polymerization is smaller than 2,500, sometimes the mechanical properties of the molded articles obtained from the resin composition of the present invention decrease. In addition, if the value of the number-average degree of polymerization exceeds 30,000, the resin composition of the present invention, the viscosity becomes excessively high, and stirring during manufacturing become difficult.

Examples of the organopolysiloxane as the component (C) include, specifically, polymers in which m $R_2SiO$ units are connected to form a linear chain and both ends of the molecular chain are terminated with $R_3SiO_{1/2}$ units, as shown in the formula below. In this case, m+2 is the number average degree of polymerization, and preferably, $2,500 \leq m+2 \leq 30,000$, as indicated previously.

$$R_3SiO(R_2SiO)_mSiR_3$$

Herein, R represents, as indicated above, a hydroxyl group, an alkyl group having 1 to 10 carbon atoms, an alkenyl group or an aryl group having 2 to 10 carbon atoms. Although it does not matter whether each R is identical with or different from the others, in terms of moldability, it is preferred that at least 80% the entirety of R groups included in the organopolysiloxane of the component (C) are methyl groups.

The mixing amount of the component (C) is, per 100 parts by mass of the component (A), 1.0 to 50 parts by mass or, preferably 1.5 to 30 parts by mass, and more preferably 2.0 to 20 parts by mass. With a mixing amount of smaller than 1.0 part by mass, no sufficient flame-retardancy can be exhibited, and if 50 parts by mass are exceeded, the resin composition becomes rubbery and non-uniform dispersion of the present component in the resin results in a decrease of flame-retardancy. In the present invention, the component (C) may be used by combining two or more kinds.

The component (D) in the present invention is a compound represented by the following chemical formula (2), (3) or (4).

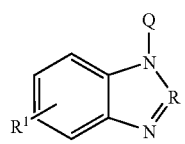

(2)

In the formula (2), R represents a carbon atom or a nitrogen atom, $R^1$ represents an alkyl group having 1 to 20 carbon atoms or an alkylphenyl group having 7 to 20 carbon atoms, and Q represents a hydrogen atom or a sodium atom.

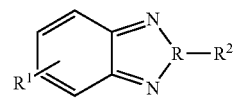

(3)

In the formula (3), R represents a carbon atom or a nitrogen atom, $R^1$ represents an alkyl group having 1 to 20 carbon atoms or an alkylphenyl group having 7 to 20 carbon atoms, $R^2$ represents a hydrogen atom, a hydroxyl group, an alkyl group having 1 to 20 carbon atoms, an alkylphenyl group having 7 to 20 carbon atoms, or a group represented by the formula (5) indicated below.

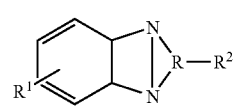

(4)

In formula (4), R represents a carbon atom or a nitrogen atom, $R^1$ represents an alkyl group having 1 to 20 carbon atoms or an alkylphenyl group having 7 to 20 carbon atoms, $R^2$ represents a hydrogen atom, a hydroxyl group, an alkyl group having 1 to 20 carbon atoms, an alkylphenyl group having 7 to 20 carbon atoms, or a group represented by the following formula (5).

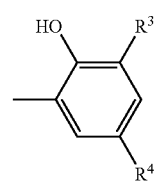

(5)

In formula (5), $R^3$ and $R^4$ each represent an alkyl group having 1 to 20 carbon atoms, an alkenyl group having 2 to 20 carbon atoms, a monovalent hydrocarbon group having 7 to 20 carbon atoms optionally containing an oxygen atom, or an alkylphenyl group having 7 to 20 carbon atoms. The monovalent hydrocarbon group having 7 to 20 carbon atoms optionally containing an oxygen atom is a group containing a monovalent hydrocarbon group having 7 to 20 carbon atoms, and therein, a hydroxyl group, a carbonyl group, an ether group or the like.

Specifically, the following compounds having a benzotriazole structure or a benzoimidazole structure can be named as examples of the component (D). Among the component (D) compounds shown by the structural formulas below, 1H-benzotriazole, 4-methyl-1H-benzotriazole and 5-methyl-1H-benzotriazole excel most in flame-retardancy.

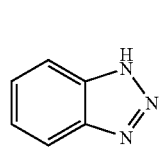 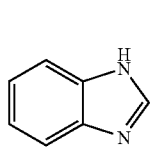 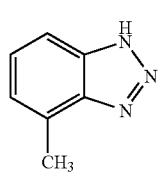 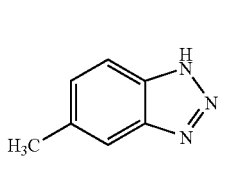

-continued

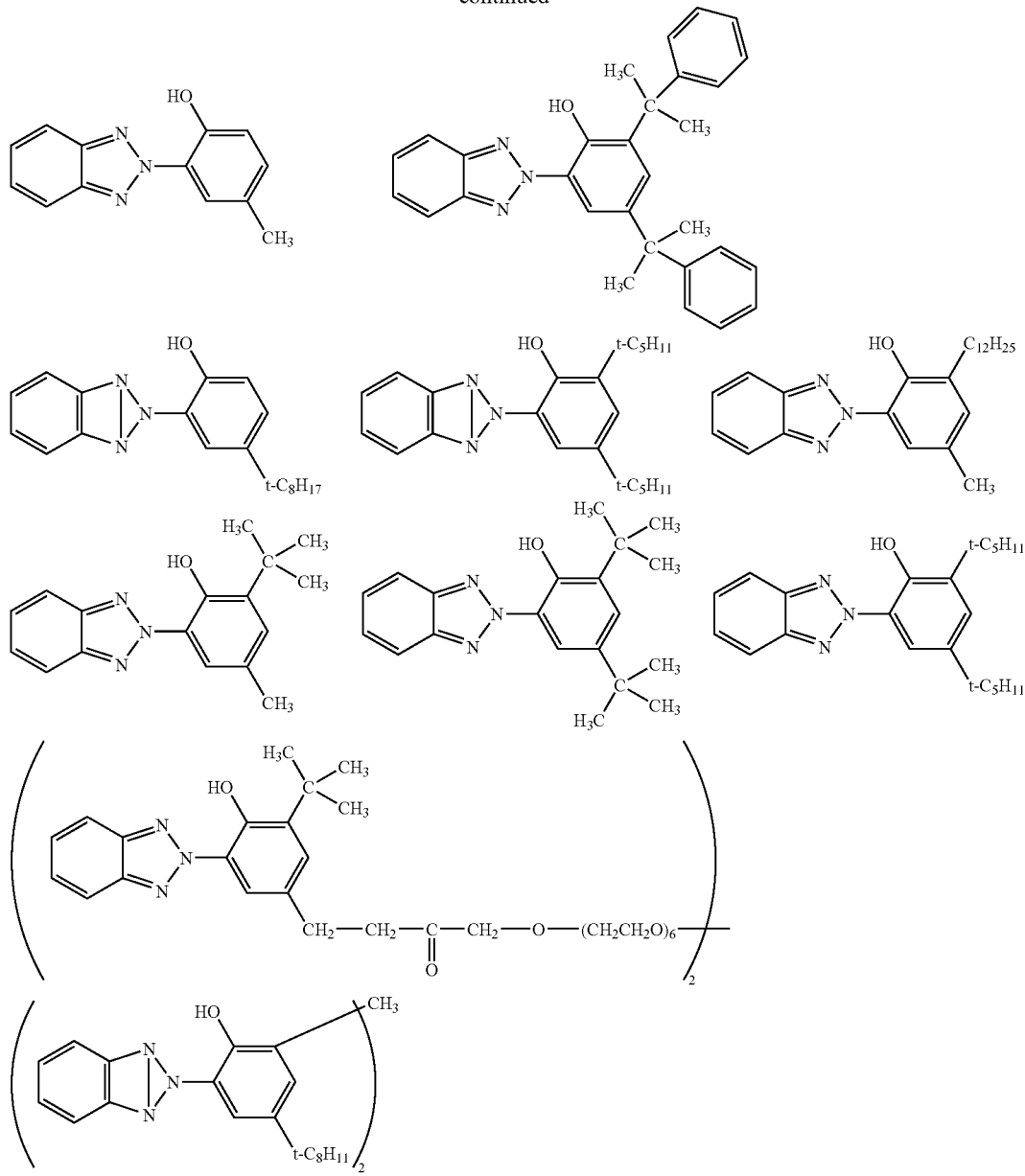

The mixing amount of the component (D) is, per 100 parts by mass of Component (A), 0.01 to 10 parts by mass or, preferably 0.1 to 5 parts by mass, and more preferably 0.5 to 3 parts by mass. With a mixing amount of smaller than 0.01 part by mass, no increase in the flame-retardant effect is obtained. With a mixing amount exceeding 10 parts by mass, the flame-retardant effect starts to drop. In the present invention, the component (D) may be used by combining two or more kinds thereof.

In the present invention, the flame-retardant effect can be all the more increased by further adding a catalyst containing an element of the platinum group, as the component (E) in addition to the aforementioned components (A) to (D). One or more kinds selected from a platinum catalyst, a palladium catalyst and a rhodium catalyst is preferred as the catalyst (E) containing an element of the platinum group. In addition, the component (E) is not an element of the platinum group alone, but more preferably the element of the platinum group in a complexed state, and, in particular, a complex modified with an organosiloxane or an alcohol is particularly preferred.

Preferably, 0.01 to 10 parts by mass of the component (E) is mixed per 100 parts by mass of the component (A). Although an increase in the flame-retardant effect can be ensured even if the component (E) is omitted in the formulation, flame-retardancy increases further by mixing the component (E). However, if 10 parts by mass is exceeded, coloration due to complex formation is occasionally observed, and if smaller than 0.01 part by mass, an increase in flame-retardant effect is sometimes not obtained.

Further additives can be admixed with the non-halogen flame-retardant resin composition of the present invention within a range that does not decrease the properties thereof, and according to the objective thereof. Oxidation inhibitors, ultraviolet t absorbers, stabilizers, compatibilizers, other types of non-halogen flame-retardant agents, lubricants, fillers, adhesion promoters and corrosion inhibitors, can be named as such additives.

Examples of the oxidation inhibitors usable in the present invention include: 2,6-di-tert-butyl-4-methyl phenol, n-octadecyl-3-(3',5'-di-tert-butyl-4-hydroxyphenyl)propionate, tetrakis[methylene-3-(3,5-di-tert-butyl-4-hydroxyphenyl)propionate]methane, tris-hydroxymethyl-aminomethane (3,5-di-tert-butyl-4-hydroxybenzyl)isocyanurate, 4,4'-butylidene bis-(3-methyl-6-tert-butyl phenol), triethylene glycol-bis[3-(3-tert-butyl-4-hydroxy-5-methylphenyl)propionate], 3,9-bis{2-[3-(3-t-butyl-4-hydroxy-5-methylphenyl)propionyl oxy]-1,1-dimethyl ethyl}-2,4,8,10-tetraoxa spiro[5,5] undecane, 4,4-thio bis-(2-tert-butyl-5-methyl phenol), 2,2-methylene bis-(6-t-butyl-methyl phenol), 4,4-methylene bis-(2,6-di-tert-butyl phenol), 1,3,5-trimethyl-2,4,6-tris-hydroxymethyl-aminomethane (3,5-di-tert-butyl-4-hydroxybenzyl)benzene, tris-hydroxymethyl-aminomethane nonyl phenyl phosphite, tris-hydroxymethyl-aminomethane (2,4-di-tert-butyl phenyl)phosphite, distearyl pentaerythritol phosphite, bis(2,4-di-tert-butyl phenyl)pentaerythritol phosphite, bis(2,6-di-tert-butyl-4-methylphenyl)pentaerythritol phosphite, 2,2-methylene bis(4,6-di-tert-butyl phenyl)octyl phosphite, tetrakis(2,4-di-tert-butyl phenyl)-4,4'-biphenylene-di-phosphonite, diurayl-3,3'-thiodipropionate, dimyristyl-3,3'-thiodipropionate, pentaerythritol tetrakis(3-lauryl thiopropionate), 2,5,7,8-tetramethyl-2(4,8,12-trimethyl decyl)chroman-2-ol, 5,7-di-tert-butyl-3-(3,4-dimethylphenyl)-3H-benzofuran-2-one, 2-[1-(2-hydroxy-3,5-di-tert-pentyl phenyl)ethyl]4,6-dipentyl phenylacrylate, 2-tert-butyl-6-(3-tert-butyl-2-hydroxy-5-methylbenzyl)-4-methylphen-ylacrylate, tetrakis(methylene)-3-(dodecyl thiopropionate) methane, and the like.

Examples of the stabilizers usable in the present invention include various metal soap-based stabilizers, such as, magnesium stearate, calcium laurate, calcium ricinoleate, calcium stearate, barium laurate, barium ricinoleate, barium stearate, zinc laurate, zinc ricinoleate and zinc stearate, various organotin compound-based stabilizers from the laurate-based, maleate-based ones and the mercapto-based ones, various lead-based stabilizers such as lead stearate and tribasic lead sulfate, epoxy compounds such as epoxidized vegetable oils, phosphite compounds such as alkyl allyl phosphite and trialkyl phosphite, β-diketone compounds such as dibenzoyl methane and dehydroacetic acid, polyols such as sorbitol, mannitol and pentaerythritol, hydrotalcites and zeolites.

Examples of compatibilizers usable in the present invention include acrylorganopolysiloxane copolymers, partially crosslinked products of silica and organopolysiloxanes, silicone powders, MQ resins, anhydrous maleated graft-modified polyolefins, carboxylated graft-modified polyolefins, polyolefin graft-modified organopolysiloxanes, and the like.

In addition, examples of the adhesion promotors usable in the present invention include various alkoxysilanes and the like.

Examples of other types of the above-mentioned non-halogen flame-retardant agents usable in the present invention include zinc borate, zinc stannate, various phosphorus-based flame-retardant agents, expandable graphite, melamine cyanurate, guanidine sulfamate, photooxidized titanium, and the like. In addition, examples of the fillers include silicic acid, calcium carbonate, titanium dioxide, carbon black, kaolin clay, calcined clay, aluminum silicate, magnesium silicate, calcium silicate, baryte and the like.

The non-halogen flame-retardant resin composition of the present invention is obtained by homogeneously kneading the aforementioned components (A) to (D) (and a further component (E), if necessary) with a kneader such as a Banbury mixer, a pressurized kneader or a double-screw extruder. The kneading method is not particularly limitative insofar as it enables uniform kneading. The molding method is also not particularly limitative and, for example, kneading of the blend is followed by pelletization and the pellets obtained are subjected to molding by a suitable molding method such as film molding, compression molding, calender-roll molding, extrusion molding and others to obtain a variety of molded articles.

The non-halogen flame-retardant resin composition of the present invention excels in particular as a material for forming flame-retardant electric wires, flame-retardant cables, flame-retardant tubes and flame-retardant shees. In addition, it can also be used widely for various household electric appliances, OA instruments, building materials, and the like.

EXAMPLES

In the following, the present invention will be described in detail by way of examples and comparative examples, but the scope of the present invention is never limited by these examples provided that the scope of the invention is not outranged thereby. Note that the numerals given in the spaces of Table 1 for the respective base materials refer to the amount of the base materials compounded in the respective examples in parts by mass.

Examples 1 to 18 and Comparative Examples 1 to 8

The base materials in each of these examples were taken in the proportions listed in Table 1 or Table 2 and kneaded together in a Laboplastomill (manufactured by Toyo Seiki Co. Ltd.). The kneading conditions depended on the types of the base resin and, when the base resin was (1) the ethylene-vinyl acetate copolymeric resin, (2) the polypropylene resin or (3) styrene-based thermoplastic elastomer or the ethylene-vinyl acetate copolymeric resin for peroxide crosslinking, kneading was conducted under the conditions of (1) 150° C./3 minutes/30 rpm, (2) 190° C./3 minutes/30 rpm and (3)180° C./3 minutes/30 rpm, respectively. The kneaded compounds were pelletized by extrusion followed by compression molding of the pellets for 1 minute at 150° C. under 100 kg/cm$^2$ to prepare sample specimens for evaluation of the flame retardancy.

<Flame-retardancy Evaluation Method>

The Horizontal Burning Test defined in UL-94 of the UL specification was performed for the sample specimens prepared as described above (thickness: ⅛ inch), to evaluate whether or not the flame-retardant grade V-0 could be cleared. The results are shown in Table 1 and Table 2. In Table 1, those that passed V-0 are represented by a mark A and those that failed by a mark B.

The respective base materials compounded in the above tests and indicated in Tables 1 and 2 by *1 to *18 are characterized below.

TABLE 1

| Material | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| *1 | 100 | 100 | 100 | 100 | 100 | 100 | 100 | 100 | 100 | | 100 | | 100 | 100 | 100 | 100 | 100 | 100 |
| *2 | | | | | | | | | | 100 | | | | | | | | |
| *3 | | | | | | | | | | | | 100 | | | | | | |
| *4 | 150 | 118 | 134 | 150 | 100 | 145 | 150 | 150 | 150 | 150 | 80 | 150 | 100 | 150 | 150 | 150 | 150 | 150 |
| *5 | | | | | | | | | | | 80 | | | | | | | |
| *6 | 9 | 10 | 24 | 8 | 4 | 9 | 8 | 8 | 8 | 8 | 8 | 8 | 9 | | 8 | 8.5 | 8 | 8 |
| *7 | | | | | | | | | | | | | | 9 | | | | |
| *8 | | | | | | | | | | | | | 1 | 1 | 2 | 0.5 | | |
| *9 | 1 | 1 | 1 | 1 | 1 | 5 | | | | | | | | | | | | 1 |
| *10 | | | | | | | | | | | | | | | | | 1 | |
| *11 | | | | | | | 1 | | | 1 | 1 | 1 | | | | | | |
| *12 | | | | | | | | 1 | | | | | | | | | | |
| *13 | | | | | | | | | 1 | | | | | | | | | |
| *14 | 1 | 1 | 1 | 1 | 1 | 1 | 1 | 1 | 1 | 1 | 1 | 1 | 1 | 1 | 0.03 | 1 | 1 | 1 |
| *15 | | | | | | | | | | | | | 50 | | | | | |
| Flame retardancy (V-0) | A | A | A | A | A | A | A | A | A | A | A | A | A | A | A | A | A | A |

*1: Ethylene-vinyl acetate copolymer (EVA) resin (Evaflex 360, product name, manufactured by Mitsui-Du Pont Polychemicals Co., Ltd.)
*2: PM854X (product name, polypropylene resin, manufactured by Sun Allomer Co., Ltd.)
*3: SEPTON Compound CEOC3 (product name, styrene based thermoplastic elastomer, manufactured by Kuraray Co., Ltd.)
*4: KISUMA 5A (product name, fatty acid-treated magnesium hydroxide, manufactured by Kyowa Chemical Industry Co., Ltd.)
*5: HIGILITE H42S (product name, aluminum hydroxide, manufactured by Showa Denko Co., Ltd.)
*6: Polyorganosiloxane A (manufactured by Shin-Etsu Chemical Co., Ltd.)
$[(CH_3)_3SiO_{1/2}]_2[(CH_3)_2SiO_{2/2}]_{7000}$
*7: Polyorganosiloxane B (manufactured by Shin-Etsu Chemical Co., Ltd.)
$[(CH_3)_3SiO_{1/2}]_2[(CH_3)_2SiO_{2/2}]_{3000}$
*8: 1H-benzotriazole (manufactured by Wako Pure Chemical Industries Co., Ltd.)
*9: Methyl-1H-benzoimidazole (mixture, manufactured by Tokyo Chemical Industry Co., Ltd.)
*10: Benzoimidazole (manufactured by Wako Pure Chemical Industries Co., Ltd.)
*11: TINUVIN 234 (product name, 2-[2-hydroxy-3,5-bis(dimethylbenzyl)phenyl]-benzotriazole, manufactured by Ciba Specialty Chemicals Co., Ltd.)

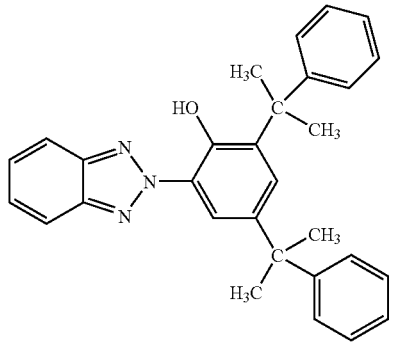

*12: TINUVIN 328 (product name, 2-(2'-hydroxy-3',5'-di-t-amyl)benzotriazole, manufactured by Ciba Specialty Chemicals Co., Ltd.)

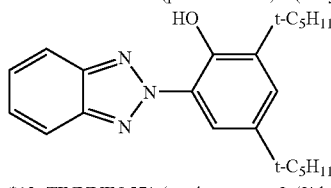

*13: TINUVIN 571 (product name, 2-(2'-hydroxy-3'-dodecanyl-5'-methylphenyl)benzotriazole, manufactured by Ciba Specialty Chemicals Co., Ltd.)

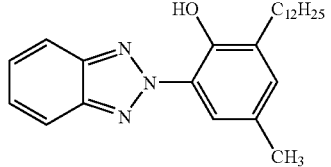

*14: CAT-PL-56 (product name, platinum catalyst containing 0.5% platinum, manufactured by Shin-Etsu Chemical Co., Ltd.)
*15: PH talc (product name, talc, 6.0 μm average particle diameter, Takehara Kagaku Kogyo Co., Ltd.)
*16: Polyorganosiloxane C (manufactured by Shin-Etsu Chemical Co., Ltd.)
$[(CH_3)_3SiO_{1/2}]_2[(CH_3)_2SiO_{2/2}]_{800}$
*17: Methylvinyl silicone oil (manufactured by Shin-Etsu Chemical Co., Ltd.)
$[(CH_3)_3SiO_{1/2}]_2[(CH_3)(CH_2CH)SiO_{2/2}]_{50}[(CH_3)_2SiO_{2/2}]_{200}$
*18: Nofmer BC (product name, 2,3-dimethyl-2,3-diphenyl butane, manufactured by Nippon Oils & Fats Co., Ltd.)

| | Comparative Example No. | | | | | | | |
|---|---|---|---|---|---|---|---|---|
| | 1 | 2 | 3 | 4 | 5 | 6 | 7 | 8 |
| *1 | 100 | 100 | 100 | 100 | | 100 | 100 | 100 |
| *2 | | | | | 100 | | | |
| *4 | 158 | 160 | 152 | | | 160 | 150 | 150 |
| *5 | | | | | 80 | 80 | | |
| *6 | | | | | | | 8 | 7 |
| *16 | | | | 8 | | | | |
| *17 | | | | | | | | |
| *8 | | 1 | | | 1 | | | |
| *14 | | 1 | | | 1 | | | 1 |
| *18 | | | | | | | 2 | |
| Flame retardancy (V-0) | B | B | B | B | B | B | B | B |

(Results of Evaluation Tests)

The non-halogen flame-retardant resin composition of the present invention demonstrated high flame-retardancy passing V-0 of UL-94, and in addition, moldability thereof was also satisfactory.

What is claimed is:

1. A non-halogen flame-retardant thermoplastic resin composition which comprises, as a uniform blend:
   (A) 100 parts by mass of a halogen-free thermoplastic resin other than a polycarbonate resin and a polyphenylene ether resin;
   (B) from 10 to 300 parts by mass of an inorganic powder;
   (C) from 1 to 50 parts by mass of an organopolysiloxane represented by the average unit formula

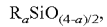

$R_aSiO_{(4-a)/2}$, in which R represents a hydroxyl group, an alkyl group having 1 to 10 carbon atoms, an alkenyl group having 2 to 10 carbon atoms or an aryl group, and the subscript a represents a number in the range from 1.9 to 2.1; and
   (D) from 0.01 to 10 parts by mass of a compound represented by the formula

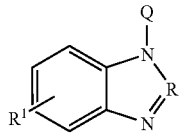

in which R represents a carbon atom or a nitrogen atom, $R^1$ represents a hydrogen atom an alkyl group having 1 to 20 carbon atoms or an alkylphenyl group having 7 to 20 carbon atoms, and Q represents a hydrogen atom or a sodium atom.

2. The non-halogen flame-retardant thermoplastic resin composition according to claim 1 which further comprises from 0.01 to 10 parts by mass of a catalyst containing a platinum group element.

3. The non-halogen flame-retardant thermoplastic resin composition according to claim 1 wherein the organopolysiloxane as the component (C) has a number-average degree of polymerization in the range from 2,500 to 30,000.

4. The non-halogen flame-retardant thermoplastic resin composition according to claim 1, wherein the component (A) is selected from the group consisting of polyolefin-based resins, polyvinyl acetate-based resins and polystyrene-based thermoplastic elastomers.

5. The non-halogen flame-retardant thermoplastic resin composition according to claim 1, wherein the component (B) is a metal hydroxide.

6. The non-halogen flame-retardant thermoplastic resin composition according to claim 1 wherein the component (D) is 1H-benzotriazole, 4-methyl-1H-benzotriazole or 5-methyl-1H-benzotriazole.

7. A molded article shaped from the non-halogen flame-retardant thermoplastic resin composition according to claim 1.

8. A non-halogen flame-retardant thermoplastic resin composition according to claim 1 consisting essentially of, as a uniform blend:
   (A) 100 parts by mass of a halogen-free thermoplastic resin other than a polycarbonate resin and a polyphenylene ether resin;
   (B) from 10 to 300 parts by mass of an inorganic powder;
   (C) from 1 to 50 parts by mass of an organopolysiloxane represented by the average unit formula

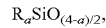

$R_aSiO_{(4-a)/2}$, in which R represents a hydroxyl group, an alkyl group having 1 to 10 carbon atoms, an alkenyl group having 2 to 10 carbon atoms or an aryl group, and the subscript a represents a number in the range from 1.9 to 2.1; and
   (D) from 0.01 to 10 parts by mass of a compound represented by the formula

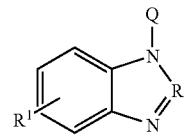

in which R represents a carbon atom or a nitrogen atom, $R^1$ represents a hydrogen atom an alkyl group having 1 to 20 carbon atoms or an alkylphenyl group having 7 to 20 carbon atoms, and Q represents a hydrogen atom or a sodium atom.

9. A non-halogen flame-retardant thermoplastic resin composition according to claim 1 consisting of, as a uniform blend:
   (A) 100 parts by mass of a halogen-free thermoplastic resin other than a polycarbonate resin and a polyphenylene ether resin;
   (B) from 10 to 300 parts by mass of an inorganic powder;
   (C) from 1 to 50 parts by mass of an organopolysiloxane represented by the average unit formula

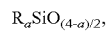

$R_aSiO_{(4-a)/2}$, in which R represents a hydroxyl group, an alkyl group having 1 to 10 carbon atoms, an alkenyl group having 2 to 10 carbon atoms or an aryl group, and the subscript a represents a number in the range from 1.9 to 2.1; and
   (D) from 0.01 to 10 parts by mass of a compound represented by the formula

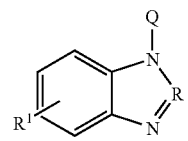

in which R represents a carbon atom or a nitrogen atom, $R^1$ represents a hydrogen atom an alkyl group having 1 to 20 carbon atoms or an alkylphenyl group having 7 to 20 carbon atoms, and Q represents a hydrogen atom or a sodium atom.

* * * * *